W. E. PHINNEY.
FISH BAIT.
APPLICATION FILED MAY 17, 1917.

1,266,311.

Patented May 14, 1918.

Witness
J. R. Tomlin
L. C. Simpson

Inventor
W. E. Phinney
By C. A. Snow & Co.
Attorney

UNITED STATES PATENT OFFICE.

WILLIS E. PHINNEY, OF COLDWATER, MICHIGAN.

FISH-BAIT.

1,266,311.   Specification of Letters Patent.   Patented May 14, 1918.

Application filed May 17, 1917. Serial No. 169,278.

*To all whom it may concern:*

Be it known that I, WILLIS E. PHINNEY, a citizen of the United States, residing at Coldwater, in the county of Branch and State of Michigan, have invented a new and useful Fish-Bait, of which the following is a specification.

The present invention relates to artificial fish baits, and aims to provide novel and improved means for causing and controlling the diving movement of the bait when drawn through the water, the means for accomplishing this purpose being extremely simple and inexpensive, being adjustable to regulate the depth to which the bait dives when drawn through the water at a certain velocity, and being readily embodied in various baits.

Another object of the invention is to provide means for causing the bait to move sidewise so that it will simulate the movement of a live bait, to thereby better attract the larger fish.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

The bait embodies a buoyant body 1 of fusiform or other suitable contour, and having suitable hooks 2.

Figure 1:
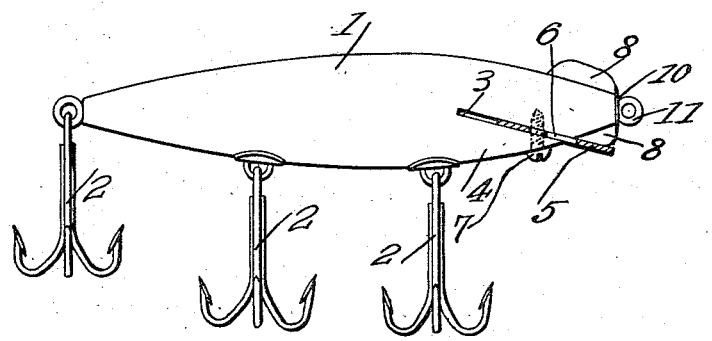
Figure 1 is a side elevation of the bait, the diving plate being shown in longitudinal section.
Figure 2:
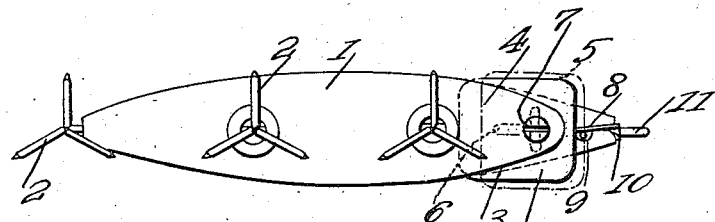
Fig. 2 is a bottom plan view of the bait, illustrating the diving plate retracted.
Figure 3:
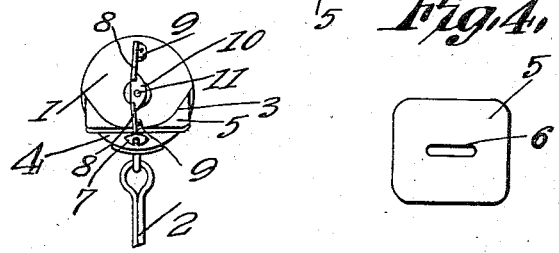
Fig. 3 is a front end view of the bait, the line attaching eye and hooks being broken off.
Figure 4:
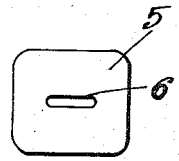
Fig. 4 is a plan view of the diving plate.

In carrying out the invention, the body 1 is provided with a rearwardly inclined slot or kerf 3 cut therein from its under surface near the forward end thereof, and providing a resilient tongue 4 underneath the slot. A rectangular plate 5 of sheet metal or other suitable material is fitted snugly in the slot 3 and is provided with an elongated longitudinal slot 6. A clamping screw 7 is threaded upwardly through the tongue 4 and into the body 1 above the slot 3 and extends through the slot 6 of the diving plate 5. By the provision of this device, it will be noted that when the plate 5 is moved to a longitudinal position within the slot 3, said plate 5 can be adjusted forwardly and rearwardly when the screw 7 is loosened. Thus, the plate 5 can be retracted, as seen in Fig. 2, so that only a small area or the forward corners thereof are exposed, thereby minimizing the depth to which the bait will dive when drawn through the water, it being noted that the plate 5 in being inclined will cause the bait to dive in the water when the bait is drawn therethrough. The plate 5 can be projected farther from the body, as seen in Fig. 1, and will be held in any adjusted position by tightening the screw 7 so that the tongue 4 clamps the plate against the upper wall of the slot 3. The plate 5 can be adjusted longitudinally the length of the slot 6 for controlling the diving movement of the bait. The farther the plate is extended, the greater will be the surface of the plate exposed to the water, to increase the diving action. When the plate is projected, it can be turned to a transverse position, as seen in dotted lines in Fig. 2, whereby the terminals of the plate provide wings at the opposite sides of the bait for still further amplifying the diving action, in order that the bait will dive deeper when drawn through the water. By removing the screw 7 and plate 5, the bait will skip on the surface of the water. This enables the fisherman to readily adjust the plate 5 to suit the circumstances.

In order to give the bait a sidewise or zigzag motion when drawn through the water, upper and lower fins 8 are provided adjacent to the forward end of the body and diverge rearwardly to fit the surface of and straddle the bait, as seen in Fig. 1. The fins 8 are disposed obliquely in the same direction, and are provided at their rear ends with ears 9 extending to one side and secured in any suitable manner to the body 1 to hold the rear ends of the fins in place. The forward ends of the fins are connected by a web 10 bearing against the forward end of the bait 1 and through which the screw eye 11 engages for the connection of the line. The fins 8 and web 10 can be readily bent from sheet metal, and the fins in being disposed obliquely will give the bait a sidewise movement when drawn through the water. The plate 5 moves snugly under the lower fin 8, whereby the parts are assembled compactly.

Having thus described the invention, what is claimed as new is:—

1. An artificial bait embodying a body having an inclined slot providing a resilient tongue, a diving plate fitted adjustably in said slot, and means carried by the body to engage the said tongue for clamping the plate between said tongue and opposite wall of the slot.

2. An artificial bait embodying a body having an inclined slot providing a spring tongue, an elongated diving plate fitted in said slot and having a longitudinal slot, and a clamping element engaged through said tongue and taken into the body, said element extending through the slot of the plate, and the plate being adjustable longitudinally and rotatably.

3. An artificial bait embodying a body, an adjustable diving plate carried by the body to be projected from the under surface thereof, and a fin projecting from the body along the edge of which said plate is projectable snugly.

4. An artificial bait embodying a body, upper and lower oblique fins straddling and fitting the forward portion of the body and having a web connecting the forward ends thereof and bearing against the forward end of the body.

5. An artificial bait embodying a body, upper and lower oblique fins straddling and fitting the forward portion of the body and having means engaging the body to hold them in place, a web connecting the forward ends of the fins and bearing against the forward end of the body, and a line attaching element engaging through said web into the body.

In testimony that I claim the foregoing as my own, I have hereto affixed my signature in the presence of two witnesses.

WILLIS E. PHINNEY.

Witnesses:
LILIAN STRAW,
ARLINE M. CHANDLER.